(12) United States Patent
Swartz et al.

(10) Patent No.: US 11,970,584 B2
(45) Date of Patent: Apr. 30, 2024

(54) RECYCLED POLYMERS FOR 3D PRINTING

(71) Applicant: IMPOSSIBLE OBJECTS, INC., Northbrook, IL (US)

(72) Inventors: Robert Swartz, Highland Park, IL (US); Michael Vasquez, Chicago, IL (US); Buckley Crist, Wilmette, IL (US); Eugene Gore, Des Plaines, IL (US)

(73) Assignee: Impossible Objects, Inc., Northbrook, IL (US)

( * ) Notice: Subject to any disclaimer, the term of this patent is extended or adjusted under 35 U.S.C. 154(b) by 0 days.

(21) Appl. No.: 18/259,911

(22) PCT Filed: Jan. 3, 2022

(86) PCT No.: PCT/US2022/011034
§ 371 (c)(1),
(2) Date: Jun. 29, 2023

(87) PCT Pub. No.: WO2022/147500
PCT Pub. Date: Jul. 7, 2022

(65) Prior Publication Data
US 2023/0391976 A1    Dec. 7, 2023

Related U.S. Application Data

(60) Provisional application No. 63/184,755, filed on May 5, 2021, provisional application No. 63/133,666, filed on Jan. 4, 2021.

(51) Int. Cl.
*C08J 11/06* (2006.01)
*B29B 17/02* (2006.01)
(Continued)

(52) U.S. Cl.
CPC .......... *C08J 11/06* (2013.01); *B29B 17/0404* (2013.01); *B29C 64/314* (2017.08); *B33Y 40/10* (2020.01);
(Continued)

(58) Field of Classification Search
CPC ... C08J 11/06; C08J 2371/10; B29B 17/0404; B29B 2017/0224; B29B 2017/042; B29C 64/314; B33Y 40/10; B33Y 70/00
See application file for complete search history.

(56) References Cited

U.S. PATENT DOCUMENTS

| 10,967,577 B2 | 4/2021 | Swartz et al. |
| 2018/0126475 A1 | 5/2018 | Mehkri et al. |

(Continued)

FOREIGN PATENT DOCUMENTS

| CN | 110483986 A * | 11/2019 |
| WO | 2020085912 A1 | 4/2020 |

OTHER PUBLICATIONS

International Search Report and Written Opinion; PCT/US2022/011034; dated Mar. 28, 2022.

*Primary Examiner* — Michael M. Robinson
(74) *Attorney, Agent, or Firm* — Dunlap Bennett & Ludwig, PLLC

(57) ABSTRACT

Waste product from any of a variety of processes (injection molding, selective laser sintering) is processed to form powders that have particle size and distribution optimal for a 3D printing technology known as Composite Based Additive Manufacturing (CBAM). Alternative recycling processes include grinding and sieving, emulsion extruding, and liquid-liquid phase separation.

4 Claims, 7 Drawing Sheets

(51) Int. Cl.
*B29B 17/04* (2006.01)
*B29C 64/314* (2017.01)
*B29K 71/00* (2006.01)
*B29K 105/00* (2006.01)
*B33Y 40/10* (2020.01)
*B33Y 70/00* (2020.01)

(52) U.S. Cl.
CPC ....... *B33Y 70/00* (2014.12); *B29B 2017/0224* (2013.01); *B29B 2017/042* (2013.01); *B29K 2071/00* (2013.01); *B29K 2105/251* (2013.01); *C08J 2371/10* (2013.01)

(56) References Cited

U.S. PATENT DOCUMENTS

2020/0307099 A1   10/2020  Daniels et al.
2021/0008629 A1*   1/2021  St-Laurent .............. B22F 9/082

\* cited by examiner

RECYCLED POLYMERS FOR 3D PRINTING

CROSS-REFERENCE TO RELATED APPLICATIONS

This application is a continuation of PCT/US2022/011034, filed Jan. 3, 2022, which claims priority to United States Provisional Patent Application Numbers 63/133,666 (filed Jan. 4, 2021) and 63/184,755 (filed May 5, 2021), each of which is herein incorporated by reference in its entirety.

FIELD OF THE INVENTION

The present inventions are in the field of 3D printing processes and systems. More specifically, the improvements are to the material inputs and feedstock for a system that creates 3D printed parts. These improvements lie within a subfield of 3D printing that the assignee hereunder originated, and that the assignee calls Composite-Based Additive Manufacturing (CBAM).

BACKGROUND 3D printing processes have many limitations. In particular, they typically have significant material limitations. For example, Selective Laser Sintering or similar methods such as High Speed Sintering and processes that are based on it, like HP's Multi Jet Fusion and the Stratasys Selective Absorption Fusion, primarily use materials known as PA12 or PA11. This is because PA12 and PA11 have a large thermal processing window which is not available for most thermoplastic polymers. Even so, the sintering process needs polymers that melt within a 10 degree Celsius processing window. In the case of PA12 and PA11, they are costly resins and the typical process for producing powders by precipitation is expensive. This leads to a small number of resins available and high costs. The polymer sintering processes require the polymer powder be held at elevated temperatures in a bed (just below the melt point of the polymer) for long periods of time. For polymers such as PA12 and PA11, this elevated heating can cause polymer chain extension and increases in molecular weight. These phenomena can reduce the ability of already-used material to be used again with standard sintering parameters. In turn, this requires complete disposal of waste powder, or blending with virgin material. This means that the sintering processes require on average twice as much powder that is in the part to be used to produce it, doubling the material cost in the part. Since this powder must be disposed of, this leads to a significant amount of waste. Similar problems are more acute in stereolithography where the resins and photopolymer are more expensive than thermoplastic resins, but also have a great deal of spoilage as well, as with two component systems used by companies like Carbon that have a limited pot life. Stereolithography further requires photoinitiators which are expensive, and the thermosets produced by stereolithography are difficult to recycle.

Similarly, injection molding, blow molding, and thermoforming produce scrap from rejects and sprues, among other things. These once-processed materials do not perform as well as virgin material for a number of reasons, including containments, impurities and changes in melt flow and crystallinity. This means that in these production processes, recycled materials do not perform consistently and in a manner necessary for mass production. Increasing usability of recycled materials will yield benefits of environmental improvement and lower cost for polymer feedstock. It would be beneficial to instill within a 3D printing process a method of using recycled polymers, and more beneficial still if the processing of recycled material for such use as a powder can eliminate impurities as a side effect of the processing. In addition to the problems cited above post consumer recycled materials like PET beverage bottles are difficult to use in recycled form due to contamination, colorant, and lack of uniformity of the material and its properties.

The Impossible Objects CBAM process (Composite Based Additive Manufacturing) does not have these problems. CBAM is disclosed in numerous patent documents, including the following, each of which is hereby incorporated by reference: U.S. Pat. Nos. 10,967,577, 10,046,552, and 9,827,754. It can use almost any thermoplastic powder. Since excess powder is captured and reapplied during the printing process, there is almost no waste. Further, since the heating is done in a press separate from the printing, there is no restricted thermal processing window.

In CBAM, a computer model divides a part to be printed into cross-sectional slices. Using printing technology (e.g., inkjet), a liquid is printed onto a porous sheet in a shape that corresponds to one of the cross sections of the object. The porous sheets are typically carbon fiber, but may also comprise fiberglass or other suitable substrates. Also, the printing could occur on the end of a fed roll (or web), with cutting done at a downstream stage. The printed sheet is flooded with a powder (typically, a thermoplastic powder) such that the powder adheres to printed regions only, and not to unprinted regions. Various means are deployed (e.g., vacuum, vibration, air knife) to remove unadhered powder from a sheet. The sheet then moves to a stacking stage, where it is placed on top of the previous sheet (if present) that has gone through a similar process for the immediately adjacent object cross section. The stacker uses tapered registration pins to keep the sheets aligned, fitting into holes that were punched into such sheets at the upstream printing stage. The process is repeated for as many cross sections as needed to create a build block of multiple substrate sheets, each stacked on top of the other in the exact order needed to represent all cross sections of the 3D object. The build block is subjected to subsequent processing in the form of compression and heating, in order for powder on the printed areas to melt and coalesce around the fibers. The resulting build block after compression and heating is then subjected to abrasion to remove substrate material, e.g., the friable carbon fiber regions that were never printed. The melted/fused regions resist this abrasion, and thus emerge from the process in the intended shape of the final 3D printed part defined by the computer model. Advantageously, the use of carbon fiber and thermoplastic powder in this way leads to a resulting part that is extremely durable and well suited for high tolerances needed in industrial applications—hence, it is a "composite-based" 3D printed part. The '552 patent describes various aspects of the foregoing system, and embodiments of subsystems that carry out each stage (i.e., material feeding, printing on a platen, powdering, removing powder, stacking, etc.). For substrate materials that are not friable such as PET, chemical removal processes can be used as described in the referenced patents.

One of the advantages of the Impossible Objects CBAM process is the ability to use high performance thermoplastic materials such as PEEK, PEKK, PAEK, PPS, and PEI. PEEK for example is very expensive material costing about $65 a pound. Conventional PEEK is difficult to convert into smooth powder, as the grinding process produces faceted particles as can be seen in FIGS. 1A and 1B (prior art). FIG. 1A shows that virgin PEEK clumps (which is not a problem with recycled PEEK discussed herein), and FIG. 1B (same as FIG. 1A but at a 500× magnification) shows the varying particle size. These powders have a broad size distribution and a significant number of small particles; the overall average particle size D50=30 microns.

One of the challenges in the CBAM process is to get a sufficient amount of polymer (thermoplastic powder) on the sheet. Since particle mass scales as the cube of the diameter of a particle, larger particles increase significantly the mass of the polymer deposited. Higher deposited mass produces stronger parts and require less compression, which means that that the layer thickness is greater, which in turn speeds up the process.

In the case of most powders, flow agents such as Aerosil 200 (From Evonik Industries of Essen, Germany) are added to the powders to improve flow properties. For example with recycled PEEK the unprocessed powder has an angle of repose of >40 degrees and after Aerosil 200 the angle of repose is <35 degrees (as measured by ASTM C1444). This allows the powder to flow well in the CBAM process.

In the case of for example PEEK, there is a substantial supply of PEEK which is discarded in a number of processes, for example injection molding. Waste PEEK material often comes from industries like medical or aerospace that only make use of virgin material due to regulatory considerations. For a number of reasons, many molders will not regrind and use reject parts, sprues and runners. In general, in injection molding only a small proportion of reground material can be used to make new parts.

SUMMARY OF THE INVENTION

In CBAM, it has been discovered that PEEK injection molding waste material can be reground and reused in high proportion or completely. Further and unexpectedly, such reground injection molding waste, when pulverized, produces a better particle size distribution and larger particles than virgin ground material that is purchased from manufactures, such as Solvay. The discarded injection molded materials (for example sprues, runners and rejects) are ground, and sieved for proper particle size distribution and then used in the CBAM process.

In addition, it has been discovered that polyolefins, PET or other polymers that are waste products of other non-CBAM techniques can be reprocessed using emulsion techniques and recycled. The emulsion process involves heating and mixing of the thermoplastic material in an immiscible liquid, then stirring or agitating at high peed to form droplets in the mixture, then cooling to solidify the thermoplastic material, after which the powder is recovered from the mixture.

DESCRIPTION OF THE DRAWING FIGURES

DETAILED DESCRIPTION OF THE PREFERRED EMBODIMENTS

Figure 1A:
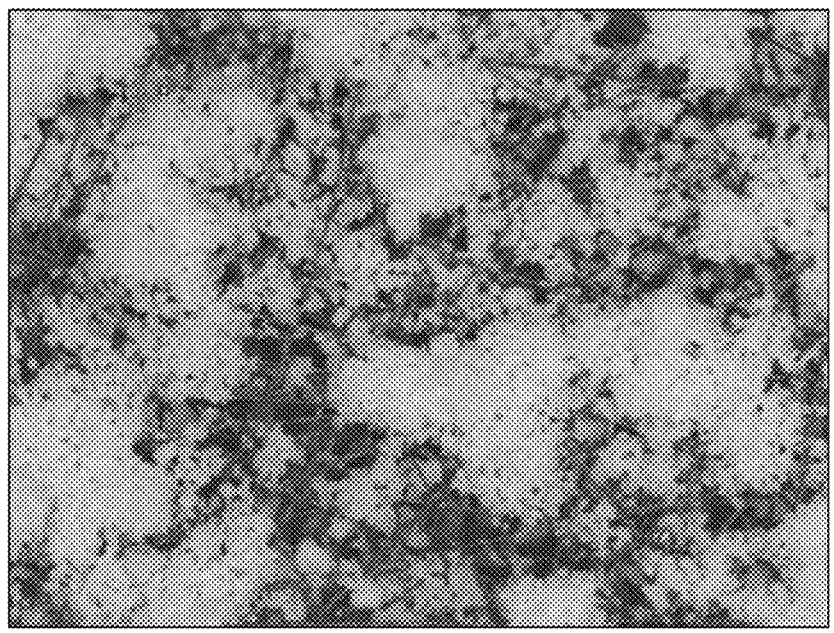
FIG. 1A (prior art) shows virgin PEEK clumps at an optical (low) resolution.
Figure 1B:
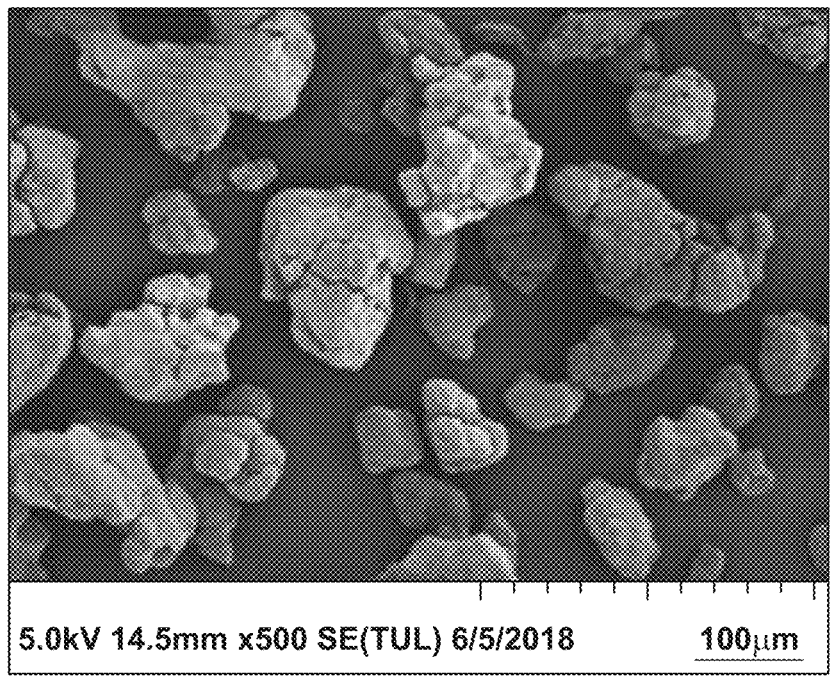
FIG. 1B (prior art) is a closeup of virgin PEEK at 500× magnification, and shows the relative nonuniformity of powder particles.
Figure 2:
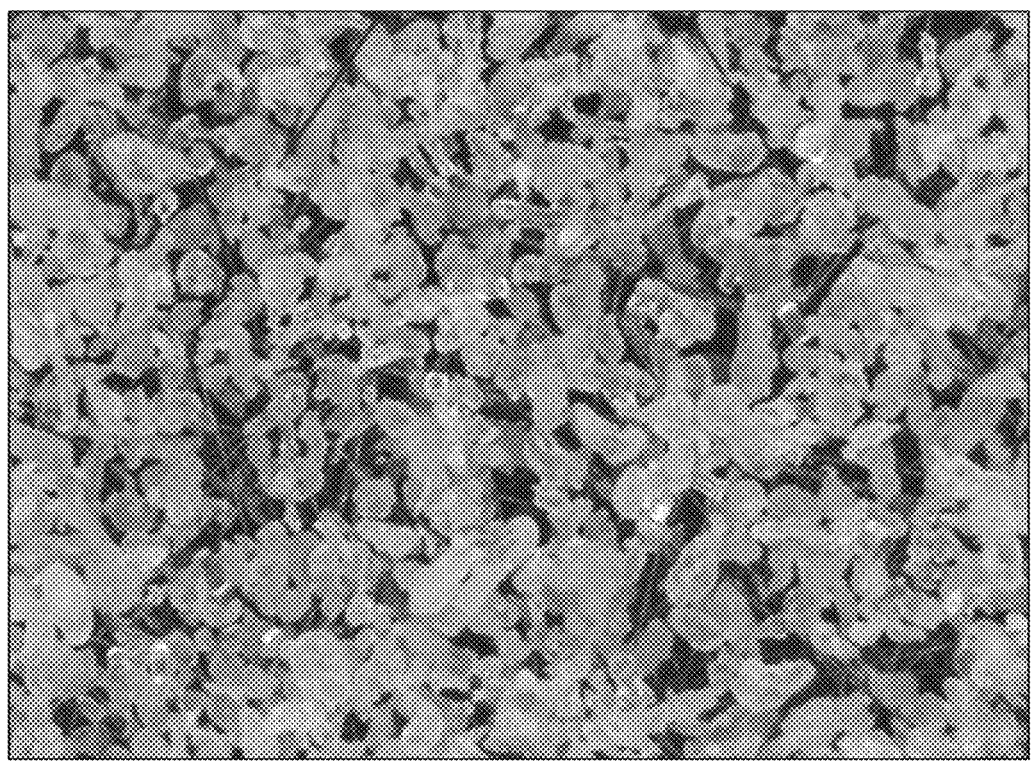
FIG. 2 shows recycled PEEK powder according to the grinding embodiment of the present invention, with D50 between 80-100 microns.

Better particle size and distribution (D50 between 80 and 100 microns) produces better (strong and dense) parts in CBAM. FIG. 2 depicts the output of the grinding embodiment described herein, containing such size and distribution. Since the newly-deployed raw thermoplastic material has heretofore been generally thrown out and the grinding is a fraction of the cost of the raw material, materials costs can be lower for such newly-used high performance PEEK than for lower performance materials like PA12. So lower cost parts can be produced which have substantially better material properties.

Recycled PEEK materials used in CBAM produce tensile strengths of 140 MPa and tensile modulus of 14 GPa which closely match the performance of conventional PEEK powders. In addition, the use of recycled materials reduces the carbon footprint of the end part. The use of such recycled powders can be expanded to almost any thermoplastic resin. These include PET for example from beverage bottles, polyolefins such polyethylene and polypropylene, polystyrene, polycarbonate and thermoplastic elastomers.

Figure 3:
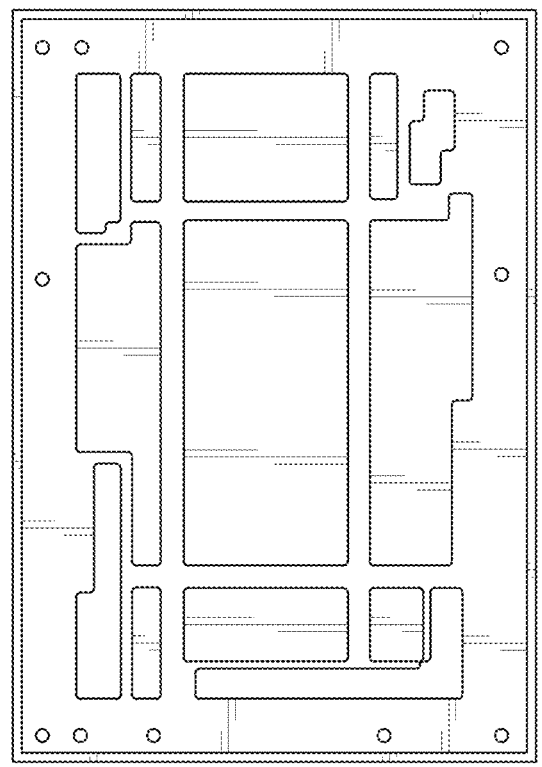
FIG. 3 shows plan views of example structures (solder pallets) made according to the CBAM process using recycled PEEK according to the grinding embodiment of the present invention.
Figure 3:
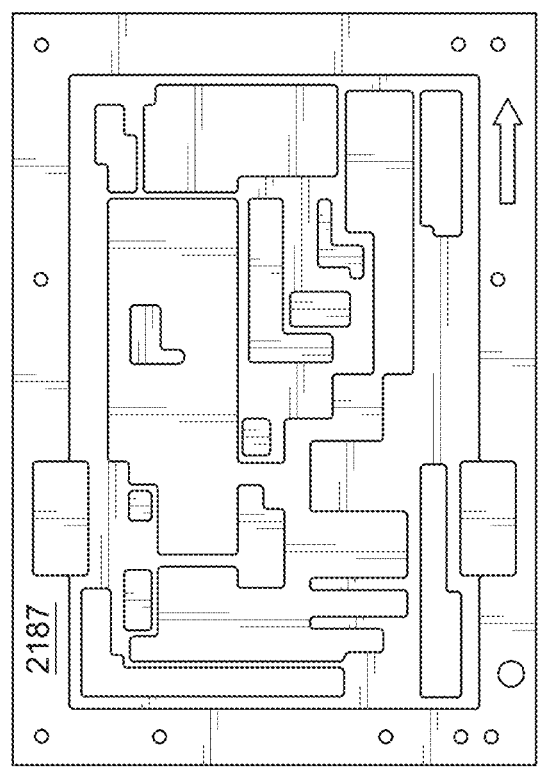

One example end part that can be made from recycled PEEK in the CBAM process is a solder pallet. FIG. 3 shows both sides of a solder pallet made with recycled PEEK powder according to the teachings herein.

In CBAM, changes or variability in melting point or melt viscosity (melt index) do not significantly affect the final part. Changes in polymer melt flow and viscosity generally have a lower impact in the CBAM process than in sintering based processes. This is because the CBAM final processing steps involve heating all the material above the melting point, then compressing the build block to a predetermined thickness which forces the molten thermoplastic to flow and consolidate. The processes and results described herein thus reveal recycled PEEK (and others) not only to possess improved powder properties (i.e., larger sizes and better distributions for maximum substrate sheet coverage in the powdering stage), but do so with a common waste product from more conventional manufacturing processes. Positive environmental impacts inevitably flow, such as lower carbon footprint, opening up a use for injection molding waste and post consumer recycled material like PET from beverage bottles, or polyethelene or polypropylene from packaging for example for which most of the product is not recycled.

The approach to use recycled materials is not limited to high performance materials such as PEEK but can be extended to many different materials, for example PET. PET material is used in among other products beverage containers for which there is great demand to be able to recycle. This material in recycled form is about half the cost of virgin material. The impurities and or colorant that may exist in recycled materials are not a significant problem for CBAM. This also applies to most thermoplastics including polyolefins, such as polyethylene or polypropylene and engineering plastics like PA12 as well PEEK, PAEK, PEKK, PPS, PEI among many other thermoplastics. PA12 or PA11 powder from sintering processes can be reclaimed, extruded again and then converted to powder for example using emulsion or other processes and reused in the CBAM process.

Additionally, substrates made out of recycled material like nonwoven PET supplied by Freudenberg Group (Weinheim, Germany) can be used and made into to parts using CBAM. This can be used with powder material like EVA and the excess material removed chemically.

Example #1: Recycled PEEK from Grinding

Figure 4:
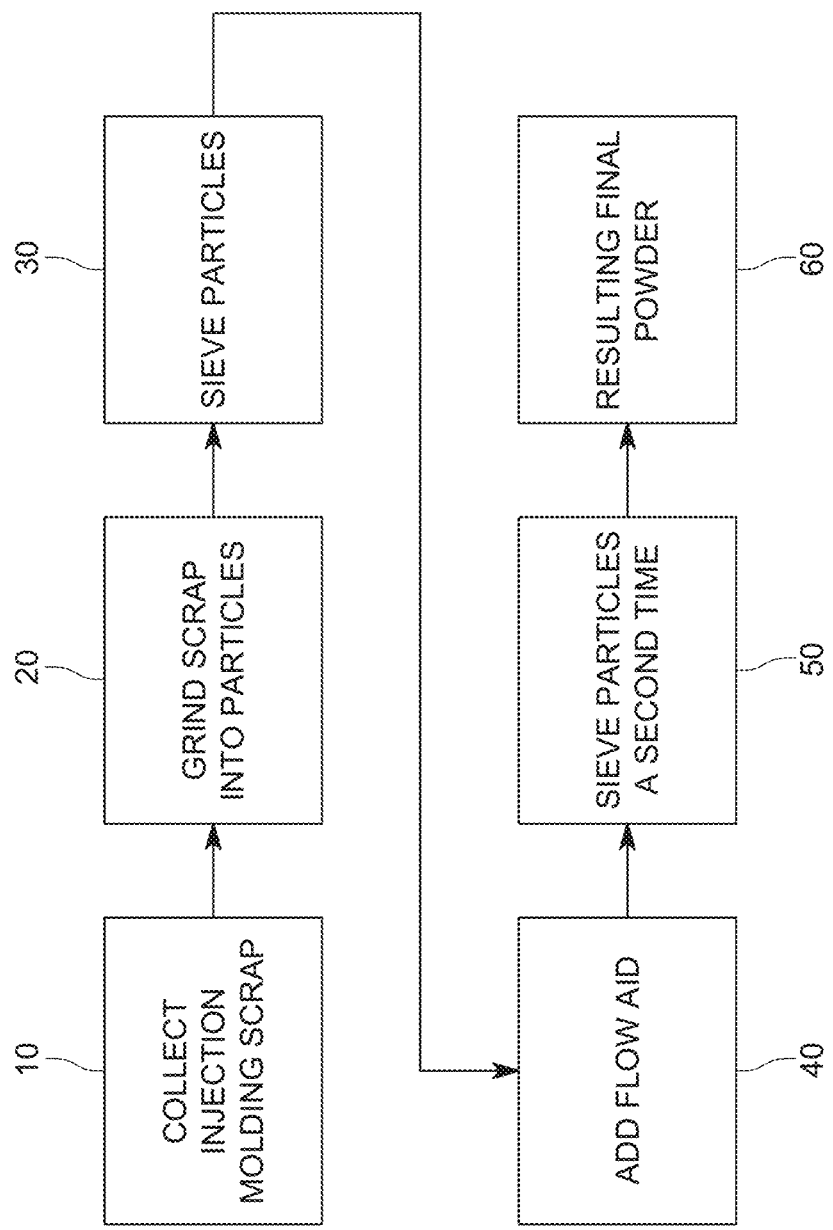
FIG. 4 shows a workflow for recycling of PEEK according to the grinding embodiment of the present invention.

With respect to FIG. 4, the following procedure is a representation of the steps required to prepare a production batch of recycled PEEK material for the CBAM system. At step 10, injection molding scrap consisting mainly of PEEK is collected. At step 20, the operator grinds the scrap into particles that will largely contain the preferred size and distribution noted above: D50 above 30 microns, more preferably above 70 microns, and most preferably between 80-100 microns. At step 30, the operator will then sieve the particles to restrict the size and distribution even further to within the desired range. At step 40, the operator then adds a flow aid. At step 50, the operator sieves the particles a second time (now including the flow aid) to yield result 60—the desired final powder containing the desired particle size and distribution, along with a flow aid.

In further detail with respect to steps 10, 20 and 30, used PEEK resin is procured from an existing industrial injection molding operation. Sprues, runners, and other waste material are collected and put through a milling system to produce a fine powder. These particles are subsequently processed through a Hosokawa Micro Air Jet Sieve tester equipped with a 140 mesh sieve to achieve an initial powder batch.

In further detail with respect to step 40, this material is treated with an Aerosil 200 silica flow aid at a concentration of 1%. These flow aid particles are mixed with the PEEK powder using a high-speed variable blender to achieve an angle of repose between 28° and 34° as measured using ASTM C1444.

Figure 5:
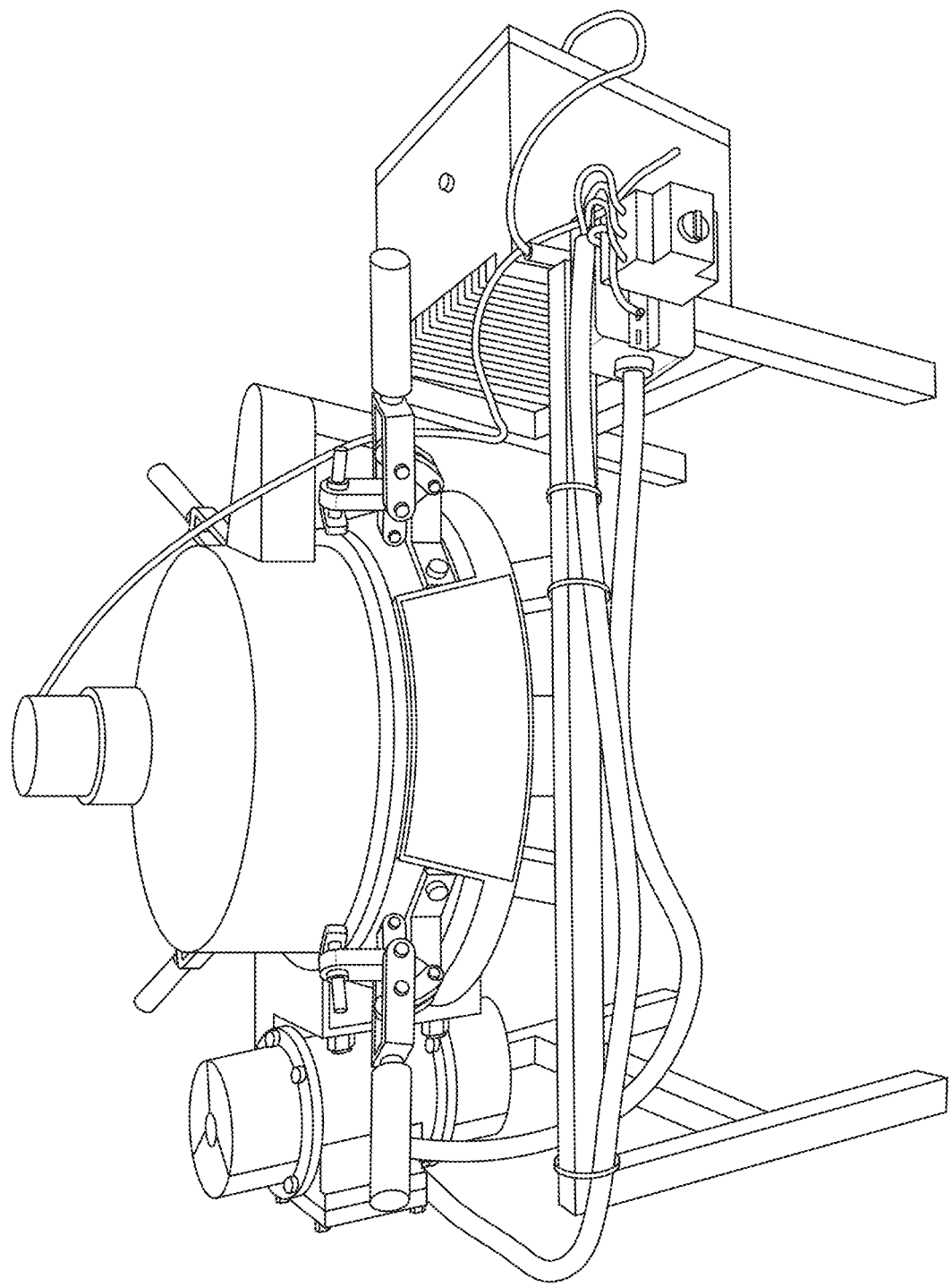
FIG. 5 (prior art) shows a Russell Ultrasonic Finnex device for high precision sieving.

In further detail with respect to step 50, the PEEK plus Aerosil mixture is put through a secondary sieving process using a Russell Finnex sieving shaker station (depicted in FIG. 5) equipped with a 140 mesh sieve and an ultrasonic head.

Figure 6:
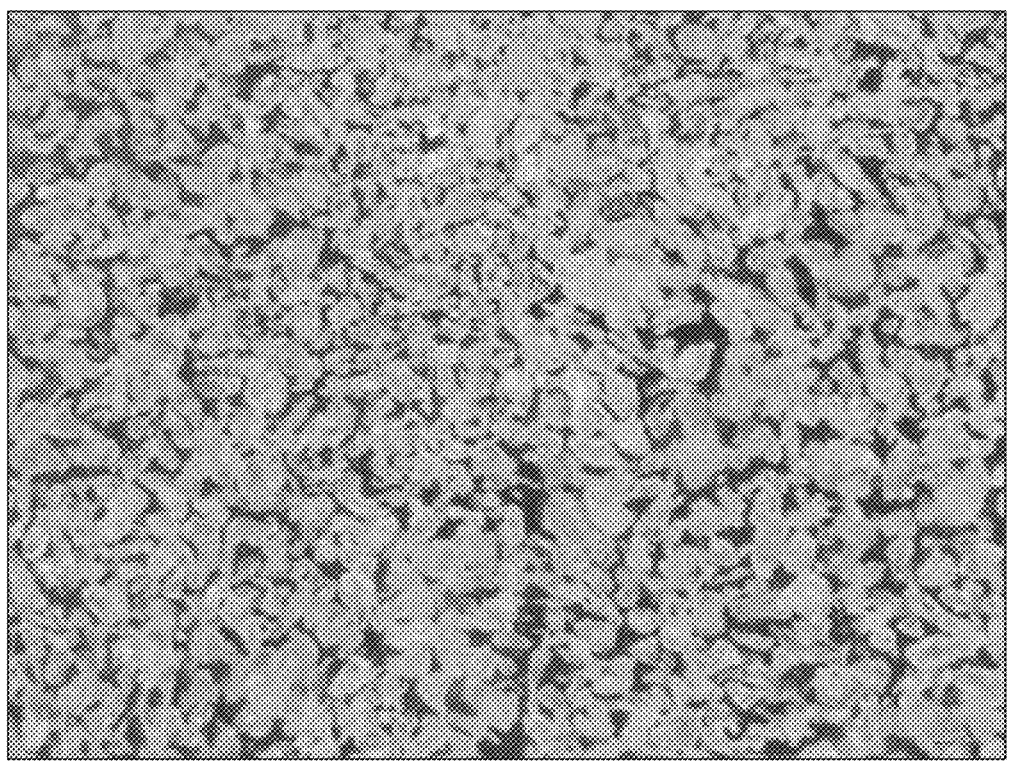
FIG. 6 shows recycled PEEK powder according to the grinding embodiment of the present invention, after addition of a flow agent.

In further detail with respect to step 60, the twice-sieved material (FIG. 6) is then added to the CBAM system for production, for example into a powdering subsystem.

The general reason why recycled PEEK from injection molding has heretofore largely been rejected by industry as a main source of bulk raw material has to do with polymeric changes that occur in the material once heated to process temperatures. It is believed that polymer chains have lengthened compared to raw virgin material when such material (now in waste form) has been subjected to relatively high heat and melting, then cooling. The injection molding process requires materials with consistent molecular weight and consistent melt flow and viscosity. This is available in virgin powder resin but cannot be guaranteed in reground materials. In contrast, as described before, the CBAM process still works well with longer-chain polymers and less uniform chain length distribution polymers.

Similarly, a like change in viscosity and melt flow occurs in many pre-heated materials used in conventional sintering processes. This is why sintering waste is also usually thrown out. Already-heated material shows inconsistencies with unpredictable viscosity and melt flow preventing widespread re-use. And again, the CBAM process can admit of these alterations or variances in viscosity and melt flow while producing satisfactory workpieces.

Example #2: Recycled Polymer from Emulsion Processes

Separately from the grinding embodiment, an emulsion embodiment similarly deploys recycled polymer with satisfactory final workpiece results. In this embodiment, waste polymer (which could be PEEK, olefins, PA12, etc., or any other polymer mentioned in this patent document) is melted and mixed with an immiscible liquid. The heated mixture is then stirred or agitated at high speed to form droplets in the mixture. While the term "emulsion" is used, the resulting heated mixture may or may not precisely meet the most technical definition of an emulsion, as long as it is a combined material that suspends and contains the polymer within it (now melted).

After cooling the two-phase fluid mixture, the polymer solidifies to form the powder that is subsequently removed. This operation can take one of several forms. A continuous process such as extrusion might be used. One advantage of an emulsion process is that impurities and contaminants of recycled materials may be removed at the same time the powder is produced. This means that post-consumer recycled polyethelene, polypropylene or PET of any color can be used in the process. Additionally, since the melt flow of the polymer is less significant for CBAM, changes or variances in melt flow or molecular weight have only a minor or nonexistent effect on the process or the finished workpiece. Likewise, both clear and colored raw material are generally equally acceptable for CBAM workpieces, unlike many other processes where clear (more expensive) raw material is deemed more desirable as a material feedstock.

As one nonlimiting example of the foregoing discussion of the invention, a prior art process for the conversion of PBT granules to powder may be used to conduct the extrusion substep (R. G. Kleinjnen, M Schmid, K. Wegener: *Production and Processing of a Spherical Polybutylene Terephthalate Powder for Laser Sintering*; Applied Science, 2019, Vol. 9, pp. 1308 ff.). In the prior published discussion, 6 kg of PBT TORAYCON 1200M granules (Toray, Tokyo, Japan) were blended with 9 kg of PEG Polyglycol 3500S flakes (Clariant, Muttenz, Switzerland) in a lab scale single screw extruder (Brabender Extrusiograph, Duisburg, Germany) with barrel temperature profile of 230° C.-250° C. The extrudate exited through a slit die and was allowed to cool to room temperature; during this cooling step the molten PBT domains ($T_m$=225° C.) solidified within the molten PEG matrix ($T_m$=68° C.).

Water was used to dissolve the PEO solid matrix phase in 2.5 kg batches of the blend that were agitated in a concrete mixer and further rinsed twice after the water-insoluble PBT particles had settled. The resulting wet PBT was then dried. Microscopy showed that 75% of the PBT particles were nearly spherical (aspect ratio A=1.22), while the remaining 25% retained the fibrous shapes that were created by the shear fields in the extruder. Spherical PBT particles were classified by sedimentation to remove the smallest particles (<10 microns), followed by drying and passing through a 150 micron sieve. The particle size distribution had D10=9 microns, D50=35 microns, and D90=110 microns.

The classified, spherical PBT particles were blended with 0.05 wt % Aerosil R812 flow aid (Evonik, Essen, Germany)

and used to print tensile bars on a Superstation 2000 laser sintering machine (DTM, Austin, Texas, USA). Deleterious to the intended uses in the prior art disclosure, it was discovered that the powder obtained by the emulsion process crystallized at higher temperatures for unknown reasons. While this change adversely affects SLS parts, it would unexpectedly provide satisfactory feedstock materials for reasons described above in CBAM.

A second liquid mixture process could also advantageously be used. If the scrap/waste thermoplastic material is combined with a solvent (as opposed to a nonsolvent), powder particles can be formed by the process of liquid-liquid phase separation, LLPS. In brief, the polymer-solvent system is heated to form a homogeneous single phase—a solution. For appropriate choices of polymer molecular weight and concentration, the single solution phase will separate on cooling into a polymer-rich liquid regions that are dispersed in a polymer-lean matrix. Interfacial surface energy will drive the dispersed regions toward spherical shapes. Further cooling of the two-phase mixture will cause crystallization in the polymer-rich droplets, fixing their shapes and permitting the powder to be recovered by simple filtration. Compared to emulsion methods, LLPS does not employ high temperatures (greater than dry TO or intensive mechanical shear fields to form particles.

A prior art source provides a descriptive example of the LLPS process to make powder now believed suitable for CBAM 3D printing (M. A. Dechet, et al. a: *Production of polyamide* 11 *microparticles for Additive Manufacturing by liquid-liquid phase separation and precipitation*. Chemical Engineering Science, Vol. 197 (2019), pp. 11-25). Twenty grams of PA11 (Rislan BMNO, Arkema) was combined with 80 grams of 99.5% ethanol, denatured with 0.1% MEK, in a DBA-3 autoclave (Berghof), capable of 200 bar with magnetic stirring at 100 rpm. The temperature was raised to 190° C. and held for 15 min before cooling at 0.5-3° C./min. When the temperature had reached 50° C., the reactor was opened and the PA11 powder particles were recovered by filtration through Whatman #1 filter paper on a Buchner funnel. Molecular weight from gel permeation chromatography was decreased by about 20% with this process.

Dried powder was treated with 0.5 wt % hydrophobic fumed silica (Aerosil, Evonik). With electron microscopy, the particles appear as irregularly equiaxed granular aggregates; particle size distribution by light scattering places the volume average $D50_3$=150 microns. If continuous cooling is interrupted by isothermal holds of 30 min at 120° C. or 130° C., $D50_3$=90 microns or $D50_3$=50 microns, respectively. The LLPS powder had a SLS processing window of ° C.-19° C., depending on the cooling conditions. Tensile specimens were made on a DTM Sinterstation 2000 with a bed temperature of 170° C. and power of 0.6 J/mm². The parts were said to have good appearance, but no tensile data were reported.

The LLPS process is a batch one that requires stirring at elevated pressures. Particle size can be controlled by the cooling rate. LLPS is more likely to remove impurities and additives than the emulsion process.

In addition, waste from high speed sintering or Hewlett Packard's Multi-jet Fusion processes in particular (e.g., PA 12 that would otherwise need to be discarded) can be recycled and reused in the present emulsion embodiments, since the change in molecular weight and crystallization do not act as an obstacle to CBAM. The same is true of PET recycled non-woven substrate material, as well as cellulose or other natural fibers, and water-soluble paper, and with thermoplastic polymers such as PET and olefins with polylactic acid (derivable from corn).

Figure 7:
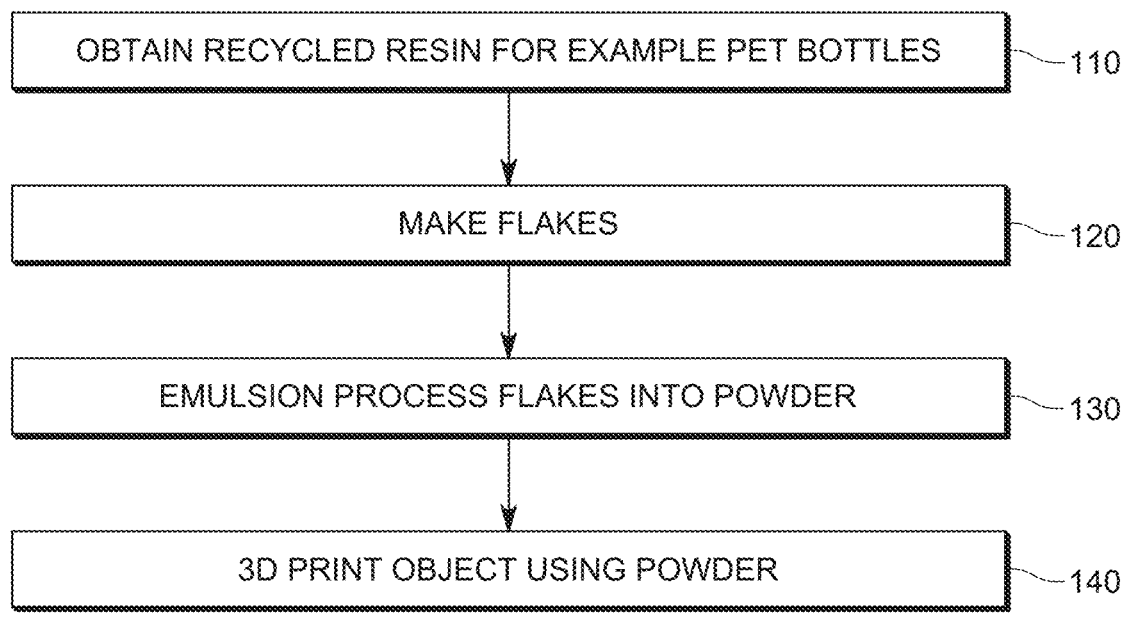
FIG. 7 shows a workflow for recycling of polymer according to the emulsion embodiment of the present invention.

With respect to FIG. 7, the following procedure is a representation of the steps required to prepare a production batch of recycled polymer material for the CBAM system according to the emulsion embodiment. At step 110, the operator obtains resin that is waste from another process or product, for example PET bottles. Such waste could also be a collection of PA12 discarded after a laser sintering process. At step 120, the operator converts the waste into flakes (if it is not already in a semi- or fully-pulverized state). This could involve the use of industrial grinders, such as those used in the grinding embodiment. At step 130, the operator then performs the emulsion process to convert the flakes into a powder. As mentioned, this process will use agitation or stirring during heating in the immiscible liquid. Finally, at step 140, the resulting powder is placed into a CBAM printing process in order to make a finished workpiece.

Just as an injection molded part distinguishes itself structurally over a welded or sculpted part that otherwise has the same overall shape, a person of skill in the art will appreciate that a 3D printed CBAM part as constructed using any of the above-described methods will distinguish itself structurally over a 3D printed CBAM part made with virgin polymer. At a microscopic level, the use of feedstock polymer material that is made into powder according to any of the above descriptions will have different characteristics and properties based on (for example) increased variances across the finished part in polymer chain length, crystallization structure and the like.

While the above specification and examples provide a description of the invention, many embodiments of the invention can be made without departing from the spirit and scope of the invention. It is to be understood that the foregoing embodiments are provided as illustrative only, and do not limit or define the scope of the invention. Various other embodiments are also within the scope of the claims.

We claim:

1. A process for making a 3D object from recycled materials comprising:
   a. converting polymer material that has been used in an industrial process or consumer product into a recycled powder;
   b. inserting said recycled powder into a powdering stage of a 3D printing process that deposits said powder onto substrate sheets to make a cross-sectional layer corresponding to a planar layer of a 3D object;
   wherein the converting step comprises:
   first, processing the polymer material into altered polymer comprising smaller particles than the polymer material originally comprised;
   second, stifling or agitating the altered polymer in an immiscible liquid to obtain sufficient shear forces to result in further altered polymer suspended in the liquid;
   third, mixing the further altered polymer with a matrix to form a polymer-matrix mixture, wherein the matrix has a lower melting point than the further altered polymer;
   fourth, placing the polymer-matrix mixture in an extruder that is heated above a melting point temperature of the altered polymer and the matrix;
   fifth, extruding the polymer-matrix mixture while it is above the melting point temperature of both the altered polymer and the matrix to form extrudate;
   sixth, cooling the extrudate below the melting point temperature of both the altered polymer and the matrix;
   seventh, in a mixing device, dissolving away the matrix with a liquid to obtain processed polymer, and
   eight, drying the processed polymer.

2. The process of claim 1 wherein the processing step creates altered polymers in the form of particles, flakes, pellets or granules.

3. A 3D object made according to the process of claim 1.

4. The 3D object of claim 3, wherein the 3D object comprises a solder pallet.

\* \* \* \* \*